United States Patent [19]

Uchikawa et al.

[11] Patent Number: 4,774,816
[45] Date of Patent: Oct. 4, 1988

[54] AIR CONDITIONER OR REFRIGERATING PLANT INCORPORATING SCROLL COMPRESSOR

[75] Inventors: Naoshi Uchikawa; Akira Murayama; Tetsuya Arata, all of Shimizu, Japan

[73] Assignee: Hitachi, Ltd., Tokyo, Japan

[21] Appl. No.: 124,279

[22] Filed: Nov. 23, 1987

[30] Foreign Application Priority Data

Dec. 4, 1986 [JP] Japan ................................ 61-289433

[51] Int. Cl.[4] .............................................. F25B 13/00
[52] U.S. Cl. ..................................... 62/324.1; 418/15; 418/55
[58] Field of Search ................. 418/15, 55; 62/324.1, 62/469

[56] References Cited

U.S. PATENT DOCUMENTS

| | | | |
|---|---|---|---|
| 4,389,171 | 6/1983 | Eber et al. | 418/15 |
| 4,676,075 | 6/1987 | Shiibayashi | 418/55 X |
| 4,730,997 | 3/1988 | Tamura et al. | 418/55 |

Primary Examiner—Lloyd L. King
Attorney, Agent, or Firm—Antonelli, Terry & Wands

[57] ABSTRACT

An air conditioner includes a scroll-type refrigerant compressor driven at a speed variable in accordance with the thermal load on the air conditioner. The compressor has stationary and orbiting scroll members assembled together to define compression chambers in which a refrigerant gas is compressed and finally discharged into a discharger chamber through a discharge port formed in the center of the end plate of the stationary scroll member. At least one bypass port and an associated check valve are provided in and on the end plate of the stationary scroll member at such a position that the check valve opens to allow the gas to be directly discharged from an associated compression chamber into the discharge chamber when the compressor is operated under such a condition that the ratio of the operation pressure ratio to the design pressure ratio of the compressor falls within a range between 0.5 and 0.75.

5 Claims, 7 Drawing Sheets

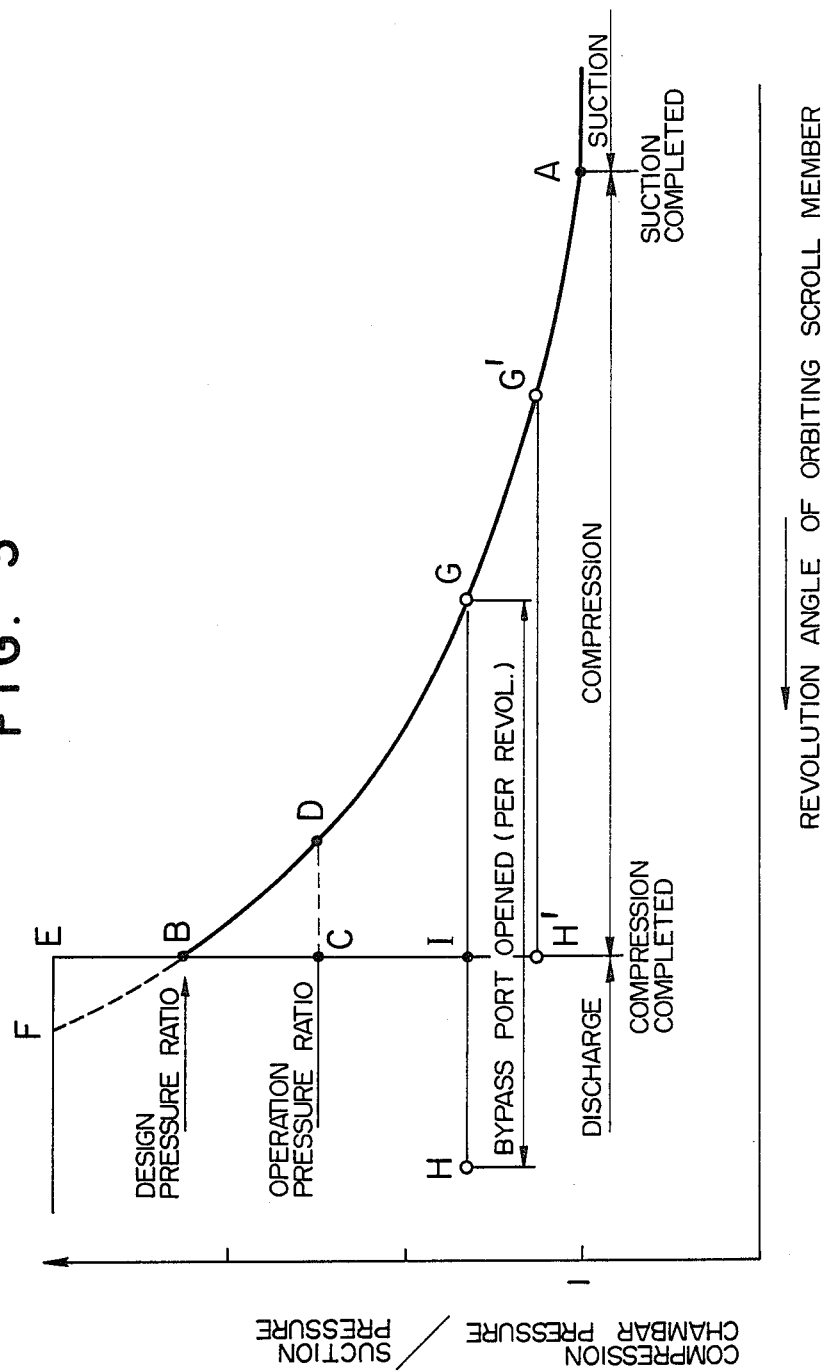

(CONSTANT SPEED COMPRESSOR)

AIR CONDITIONER OR REFRIGERATING PLANT INCORPORATING SCROLL COMPRESSOR

BACKGROUND OF THE INVENTION

The present invention relates to an air conditioner or refrigerating plant incorporating a scroll-type refrigerant compressor which is driven by a variable-speed driving system such as a driving system having an electric motor which is controlled through an inverter. More particularly, the present invention is concerned with an air conditioner of the type mentioned above, wherein the scroll-type refrigerant compressor is provided with a bypass valve which is intended for preventing refrigerant form being excessively compressed in the compressor.

Air conditioners incorporating scroll-type refrigerant compressors have been known. In general, a scroll-type refrigerant compressor (referred to as "scroll compressor" hereinafter) has an orbiting scroll member constituted by an end plate and an integral scroll wrap having an involute or a similar spiral form and protruding from one side of the end plate. The scroll compressor also has a stationary scroll member having a construction substantially the same as that of the orbiting scroll member and provided with a discharge port in the center of an end plate. The orbiting scroll member and the stationary scroll member are assembled together such that their warps mesh each other and are encased in a hermetic housing which is provided with a suction port. The orbiting scroll member is held on the housing through an Oldham's mechanism in such a manner that it cannot rotate about its own axis but its center can orbit or revolve around the center of the stationary scroll member. The revolution of the orbiting scroll member is caused by a crankshaft which is driven by an electric motor. During orbiting of the orbiting scroll member, closed spaces constituting compression chambers are successively defined by the end plates and the wraps of both scroll members and are progressively moved towards the center of the stationary scroll member while decreasing their volumes and are finally brought into communication with the discharge port in the center of the stationary scroll member. In consequence, a refrigerant gas sucked by and confined in each compression chamber is progressively compressed to a pressure higher that the suction pressure and the thus compressed refrigerant gas is discharged through a discharge port.

FIGS. 2A and 2D illustrate sucking and compressing operations performed by the scroll compressor during one full revolution of the orbiting scroll member, i.e., in the period in which the center of the scroll wrap 6b of the orbiting scroll member revolves counterclockwise from a position shown in FIG. 2A to the position shown in FIG. 2D. Referring to FIG. 2A, a space denoted by 12a formed between left portions of both scroll wraps as viewed in FIG. 2A is still open and its size is still increasing so that a refrigerant gas is sucked by this space 12a. In the state shown in FIG. 2B, the space is closed to form a closed space, i.e., compression chamber, of the maximum volume. In this state, the suction of the refrigerant gas has been completed. In the state shown in FIG. 2C, the compression chamber now denoted by 12c has been contracted and is just going to be brought into communication with the discharge port 13 in the center of the stationary scroll member. Namely, in this state, the gas in the compression chamber 12c has been fully compressed and is just going to be discharged. As the orbiting scroll member further revolves to the position shown in FIG. 2D, the closed space or compression chamber now represented by 12d is brought into communication with the discharge port 13 so that the refrigerant gas compressed in this compression chamber 12d is discharged through the discharge port 13.

The ratio of the pressure of the gas immediately before the discharge, i.e., the pressure in the compression chamber 12c shown in FIG. 2C, to the suction pressure, i.e., the pressure in the chamber 12b shown in FIG. 2B, has a constant value which is determined by factors such as the design of the scroll wraps. This ratio, expressed by (pressure immediately before discharge/suction pressure) is referred to as "design pressure ratio" of compressor. On the other hand, the value of the ratio of the pressure in the discharge port 13, i.e., the discharge pressure, to the above-mentioned suction pressure varies depending on the state of operation of the air conditioner. This ratio, expressed by (discharge pressure/suction pressure), is referred to as "operation pressure ratio".

FIG. 3 is a diagram showing the relationship between the revolution angle of the orbiting scroll member and the internal pressure of the compression chamber. At a point indicated by "A", the suction of the gas is completed in one of the compression chambers. When the orbiting scroll member has been revolved to a position shown by "B", the compression in this compression chamber is completed, thus attaining the design pressure ratio of the compressor. A further revolution of the orbiting scroll member brings this compressionchamber into communication with the discharge port so that the compressed gas is discharged. Then, after sucking the gas, another compression chamber is defined again when the orbiting scroll member has completed one full revolution to the position "A". This operation is cyclically repeated so that the gas is sucked, compressed and discharged. When the operation pressure ratio is smaller than the design pressure ratio of the compressor, the pressure in the compression chamber varies in such a manner as to follow a curve ABC. This state of compressing operation is referred to as "over-compression". It will be seen that the portion of the compressing work corresponding to the area DBC is useless. Conversely, when the operation pressure ratio is greater than the design pressure ratio, the pressure in the compression chamber varies in such a manner as to follow a curve ABE. In this case, the compressor is required to perform an additional work corresponding to the area BEF.

Obviously, the over-compression wastefully consumes the power or work, so that it should preferably be minimized. It has been known to provide a bypass valve as means for preventing such over-compression. FIG. 4 shows a known arrangement of such a bypass valve. This arrangement has a bypass port 21 formed in the end plate of the stationary scroll member so as to provide a communication between the compression chamber and a discharge chamber, and a check valve provided on the discharge side of the bypass port 21 so as to prevent any reversing of the gas from the discharge side into the compression chamber. The bypass port 21 is provided in the close proximity of the wrap 5b of the stationary scroll member. Thus, the bypass port 21 is covered by the wrap of the orbiting scroll member so that it does not communicate with a compression chamber until the compression stroke of this compression chamber caused by the revolution of the orbiting scroll member proceeds to a predetermined degree. However, as the compression stroke proceeds beyond this degree, the bypass port 21 is again opened to communicate with the compression chamber. In FIG. 3, a straight line GH represents the angular range of revolution the orbiting scroll member in which the bypass valve 21 is held in communication with the compression chamber.

When the compressor operates in accordance with the curve shown in FIG. 3 under the operation pressure ratio indicated by C, the pressure in the compression chamber varies in accordance with a curve ADC because the discharge of the gas is commenced at the point D. It will be understood that the discharge of the gas does not take place in the region between points G and D due to the presence of the check valve. In consequence, the wasteful over-compression is completed. Thus, the provision of the bypass valve, having a bypass port which opens in the region GH, can effectively prevent over-compression at least when the operation pressure ratio is I or greater. The timing at which the bypass port 21 is brought into communication with the compression chamber is determined by the position of the bypass port 21.

An example of the known scroll compressors having the described bypass valve arrangement is disclosed in U.S. Pat. No. 4,389,171.

A description will be made hereinunder as to the difference between a known air conditioner incorporating a compressor driven at a constant speed and a known air conditioner which employs a compressor the speed of which is varied, as is the case of the air conditioner of the present invention, by a variable-speed driving system such as that incorporating an electric motor controlled through an inverter.

In the air conditioner employing a constant speed compressor, the compression capacity of the compressor is constant so that the compressor has to be repeatedly started and stopped when the level of the load is smaller than the capacity of the compressor. When the compressor is stopped, a substantially equilibrium state of pressure is attained in the refrigerant circuit of the air conditioner, whereas, when the compressor operates, a pressure difference is established across the compressor so as to form a high-pressure portion and a low-pressure portion in the refrigerant circuit. This means that an additional work is required for the compressor because it has to establish the pressure difference from the equilibrium state each time it is started. In order to obviate this problem, air conditioners have been proposed in which the driving speeds of the compressors are varied such that each of the compressors is operated at a higher speed when the level of the load is high and at a lower speed when the load level is low. Since the internal volume of the refrigerant circuit is constant, the higher operation speed of the compressor, i.e., a greater rate of discharge of the refrigerant, increases and decreases the discharge pressure and the suction pressure, respectively, thus attaining a high operation pressure ratio. Conversely, a lower operation speed of the compressor, i.e., the smaller rate of discharge of the refrigerant gas, causes the discharge pressure and the suction pressure to be decreased and increased, respectively, thus establishing a low operation pressure ratio.

Although scroll compressors having bypass valves have been known, no suggestion has been made to the position of the bypass port from the view point of efficiency of the compressor. For instance, the bypass port disclosed in the aforementioned U.S. Pat. No. 4,389,171 is intended for reducing the load applied to the compressor when it is started up. Also proposed is a scroll compressor in which a bypass valve is provided so as to relieve the compressed gas when the pressure of the gas compressed in the compression chamber has been increased beyond the discharge pressure. In this known compressor, however, the position of the bypass valve is not definitely determined from the view point of efficiency of the compressor.

Thus, the prior art proposed hitherto fails to suggest positioning of the bypass valve for the purpose of improving the efficiency of operation of the compressor and, hence, of the air conditioner.

SUMMARY OF THE INVENTION

Accordingly, an object of the present invention is to provide an air conditioner or refrigerating plant employing a compressor the capacity of which is variable by the control of the driving speed of the compressor, wherein the position of the bypass valve is determined so as to optimize the efficiency of the air conditioner, thereby enabling the air conditioner to operate with a remarkably reduced energy consumption.

In general, the air conditioner employing a constant-speed compressor seldom experiences such a condition that the operation pressure ratio is lower than the design pressure ratio of the compressor. In such an air conditioner, therefore, the provision of the bypass valve for preventing over-compression does not produce any significant effect in respect of reduction in energy consumption. On the other hand, the present inventors have confirmed, through analysis of operation patterns of actual air conditioners, that the above-mentioned condition in which the operation pressure ratio is lower than the design pressure ratio is often experienced by the air conditioner employing a scroll compressor which is driven at a varying speed by a variable-speed driving system such as one which incorporates an electric motor controlled through an inverter.

Under the circumstance, the present invention provides an air conditioner or refrigerating plant the capacity of which is controlled by a scroll compressor driven by a variable-speed driving system, wherein a bypass valve with a bypass port for relieving the compressed refrigerant gas in the scroll compressor is so positioned that it is operative when a factor which is given as the ratio of the operation pressure ratio to the design pressure ratio (operation pressure ratio/design pressure ratio) is below 1 and within a predetermined most frequent range of the above-mentioned factor. In general, the bypass valve is so located that it is operative when the above-mentioned factor ranges between 0.5 and 0.75.

In the air conditioner or refrigerating plant of the invention having the bypass port located in the region specified above, the bypass valve is allowed to operate to prevent over-compression in the most frequent operating condition where the operation pressure ratio is low. Therefore, the wasteful power consumption is reduced to attain a remarkable energy saving effect.

BRIEF DESCRIPTION OF THE DRAWINGS

FIG. 3 is a diagram showing the change in the pressure in one of compression chambers formed in the scroll compressor relative to the revolution angle of the orbiting scroll member of the scroll compressor;

DESCRIPTION OF THE PREFERRED EMBODIMENT

Figure 1:
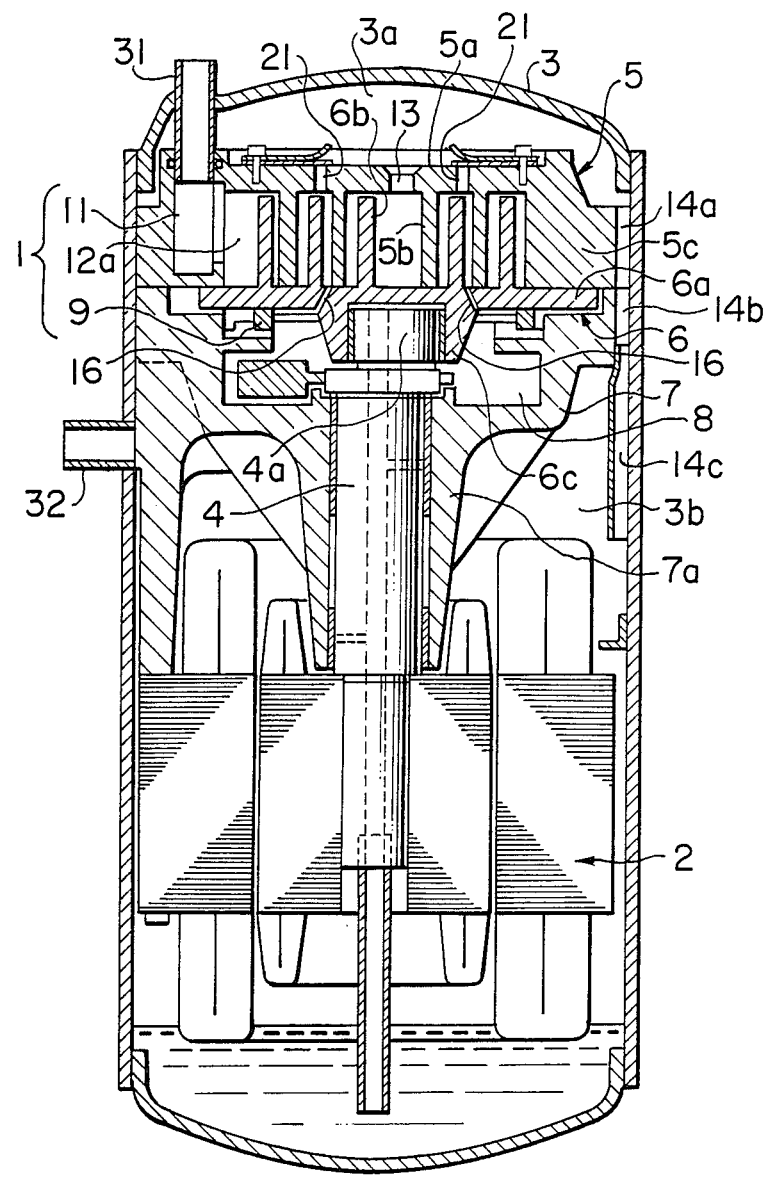
FIG. 1 is an axial sectional view of a scroll compressor incorporated in an embodiment of the present invention.
Figure 2A:
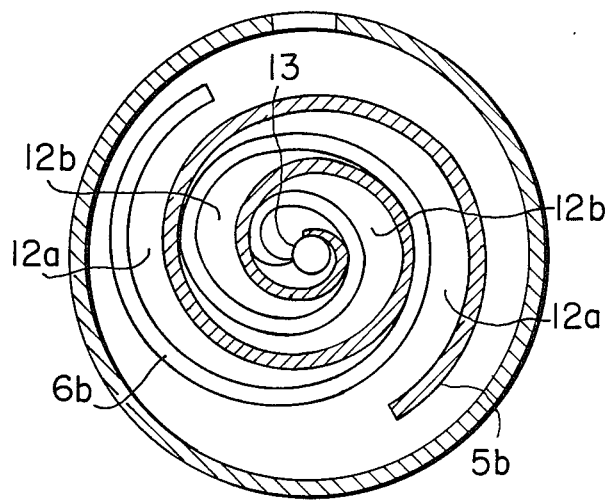
FIGS. 2A to 2D are schematic illustrations of scroll wraps of orbiting stationary scroll members of the scroll compressor in different phases of operation.
Figure 2B:
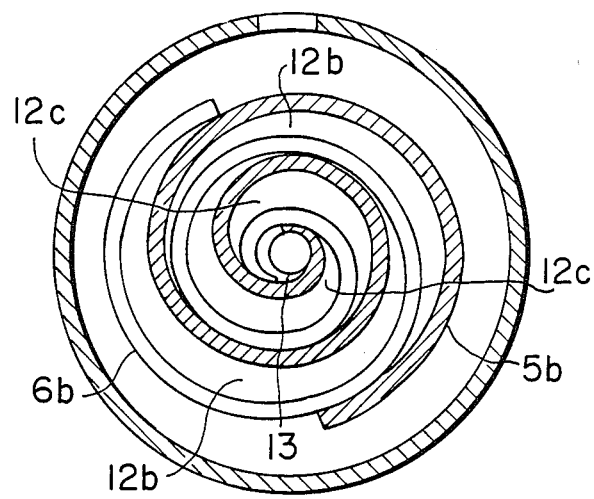
Figure 2C:
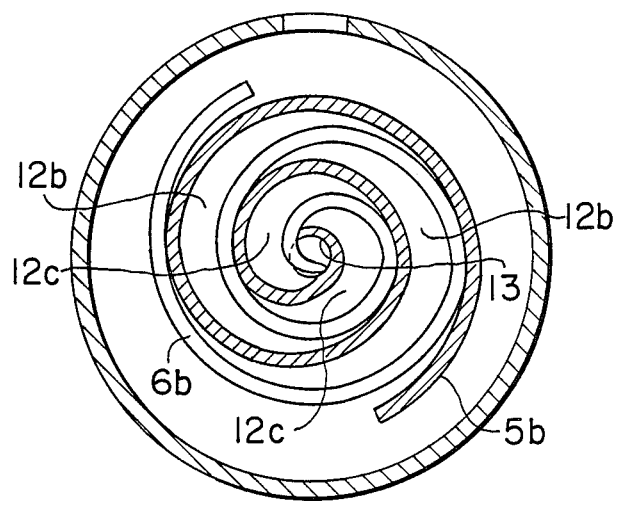
Figure 2D:
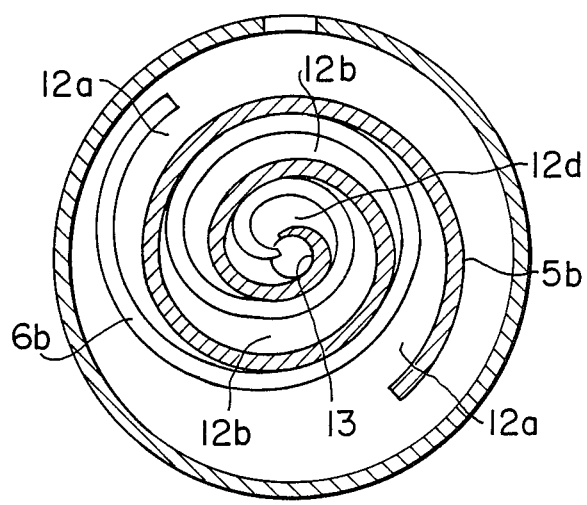

FIG. 1 is a longitudinal view of a scroll compressor incorporated in an embodiment of the air conditioner of the present invention. The compressor has a compressor section 1 composed of a stationary scroll member 5 and an orbiting scroll member 6. The compressor section 1 is placed in a hermetic container 3 and is directly coupled to an electric motor 2 which also is encased by the hermetic container 3.

The stationary scroll member 5 has an end plate 5a and a substantially spiral scroll wrap 5b formed integrally on one side of the end plate 5a so as to protrude therefrom in the axial direction of the end plate 5a. The stationary scroll member 5 further has an outer wall 5c formed on and along the outer peripheral edge of the end plate 5a and having the same axial height as the wrap 5b. The orbiting scroll member 6 has an end plate 6a and a substantially spiral scroll wrap 6b formed integrally on one side of the end plate 6a so as to protrude therefrom in the axial direction of the end plate 6a. The orbiting scroll member 6 is provided with a boss 6c integral with the end plate 6a and formed on the side of the end plate 6a opposite to the wrap 6b. The stationary scroll member 5 and the orbiting scroll member 6 are assembled together such that their wraps 5b and 6b mesh each other to defined compression chambers. The stationary scroll member 5 is rigidly fixed to a frame 7 which in turn is secured to the hermetic container 3.

The frame 7 has a central bearing 7a which supports a drive shaft 4. The frame 7 also defines, in cooperation with the end plate 6a of the orbiting scroll member 6, a back pressure chamber 8 on the side of the orbiting scroll member 6 opposite to the stationary scroll member 5.

The drive shaft 4 is provided on the upper end thereof with an eccentric pin 4a which is received in a bore formed in the boss 6c. The end plate 6a of the orbiting scroll member 6 is supported by the frame 7 through a mechanism 9 such as an Oldham's mechanism which prevents the orbiting scroll member 6 from rotating about its own axis. The arrangement is such that the rotation of the drive shaft 4 causes an eccentric rotation of the eccentric pin 4a which causes the orbiting scroll member 6 to revolve with respect to the stationary scroll member 5 without allowing the orbiting scroll member 6 to rotate about its axis.

A suction port 11 is formed in the outer peripheral portion of the stationary scroll member 5. A suction pipe 31 extends through the wall of the hermetic container 3 and is connected to the suction port 11. A discharge port 13 is formed in the center of the end plate 5a of the stationary scroll member 5 so as to open to a discharge chamber 3a above the stationary scroll member 5. The discharge chamber 3a communicates, through the passages 14a, 14b and 14c, with a chamber 3b disposed above the upper side of the electric motor. A discharge pipe 32 extends through the wall of the container 3 and opens in this chamber 3b.

Back-pressure ports 16 are formed in the end plate 6a of the orbiting scroll member 6 to provide communication between the back-pressure chamber 8 and compression chambers which are in their compression phases. More specifically, the back-pressure ports 16 communicate with two symmetrical compression chambers which are defined by the wraps 5b and 6b of both scroll members meshing each other. During the operation of the compressor, an intermediate pressure between the suction and discharge pressures is formed in each of these compression chambers in the compression phase and is transmitted to the back-pressure chamber 8 through the back-pressure ports 16. The intermediate pressure introduced into the back-pressure chamber 8 produces an axial force which acts to press the orbiting scroll member 6 axially against the stationary scroll member 5 thereby establishing sealing contact between the surface of the end plates 5a and 6a of the respective scroll members 5 and 6 and the axial end surfaces of the scroll wraps 6b and 5b of the opposing scroll members.

Figure 4:
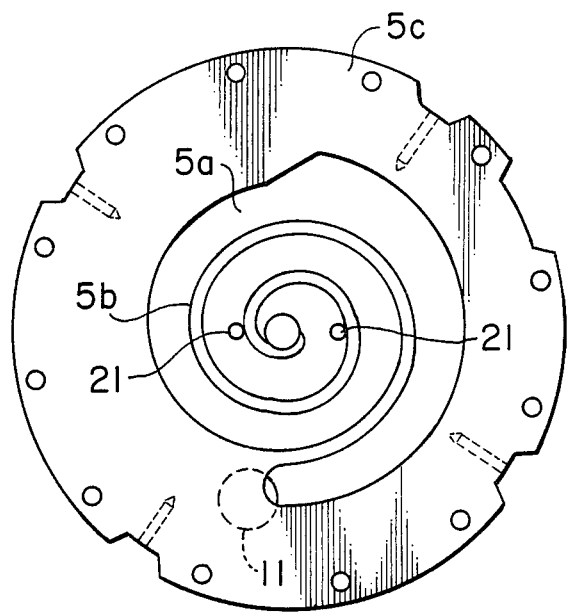
FIG. 4 is a bottom plan view of a stationary scroll member provided with bypass ports.

As will be seen from FIG. 4 which is a bottom plan view of the stationary scroll member, a pair of bypass ports 21 are formed through the thickness of the end plate 5a. Each of the bypass ports 21 has a diameter substantially equal to the radial thickness of the wrap and is located at a position in the vicinity of the wrap 5b of the stationary scroll member. More specifically, the bypass ports 21 are located such that they allow two compression chambers to be communicated with the discharge chamber when the pressure in the compression chambers has reached a level which is about 0.5 to 0.7 (50 to 70%) in terms of the ratio to the design pressure ratio of the compressor. In the illustrated embodiment, these bypass ports 21 are disposed in symmetry in such a manner as to open to symmetrical portions of the symmetric compression chambers defined by the meshing wraps 5b and 6b of the scroll members 5 and 6.

Figure 5:
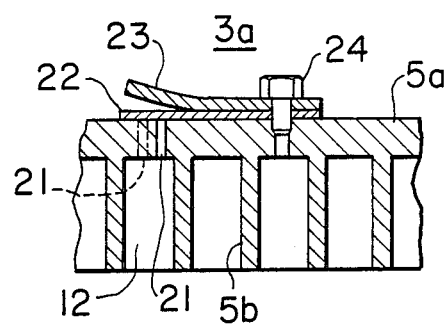
FIG. 5 is an enlarged fragmentary sectional view of the stationary scroll member showing an example of the construction of a bypass valve.

Referring now to FIG. 5, a check valve 22 in the form of a reed valve and a valve stop 23 for limiting the lift of the valve 22 are secured by a bolt 24 to the surface of the end plate 5a facing the discharge chamber 3a. The check valve 22 has a function to keep each bypass port 21 closed whenever the pressure in the discharge chamber 3a is higher than the pressure in an associated compression chamber 12 to which the bypass port 21 opens. However, when the pressure in the compression chamber 12 has been increased to exceed the level of the pressure in the discharge chamber 3a, the check valve 22 opens the bypass port 21, thus opening the bypass passage which provides a communication between the compression chamber 12 and the discharge chamber 3a so as to allow the compressed gas to be relieved from the compression chamber 12 into the discharge chamber 3a.

Figure 6:
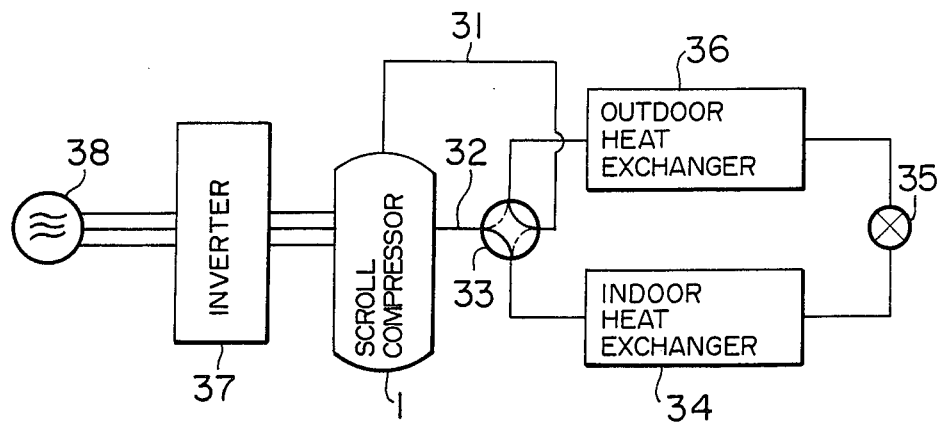
FIG. 6 is a diagram of a refrigerant circuit in an air conditioner according to the present invention.

FIG. 6 is a diagram of the refrigerant circuit of the air conditioner incorporating the scroll compressor which has been described with reference to FIGS. 1 to 5. The refrigerant circuit has a four-way change-over valve 33, an indoor heat exchanger 34, an expansion valve 35, an outdoor heat exchanger 36 and the described scroll compressor 1. The scroll compressor 1 is adapted to be driven by the electric motor 2 which is supplied with electric power from the A.C. power supply 38 through an inverter 37.

For enabling the refrigerant circuit to operate in air cooling mode, the four-way changer-over valve 33 is changer-over such that a closed loop of the refrigerant circuit is formed to enable the refrigerant discharged from the compressor 1 to return to the compressor 1 through the four-way change-over valve 33, the outdoor heat exchanger 36, the expansion valve 35, the indoor heat exchanger 34, and the four-way change-over valve 33. This circuit is reversed by switching the four-way change-over valve 33 so that the refrigeration cycle operates in air heating mode.

The driving frequency of the inverter is controlled in accordance with the level of the cooling load or the heating load in the room to be air-conditioned. When the room temperature has approached a command temperature, the frequency of the inverter is lowered so that the compressor is driven at a reduced speed. During this low-speed operation of the compressor, the rate of circulation of the refrigerant is so low that the capacities of the heat exchangers become large. In consequence, the discharge pressure is decreased, while the suction pressure is increased, so that the compressor operates with reduced operation pressure ratio.

The air conditioner is usually so designed as to have a capacity corresponding to the rated speed of the compressor as well as to cope with the maximum thermal load which is expected to occur. This means that the maximum capacity of the air conditioner is greater than the thermal load which is normally applied to the air conditioner, so that the air conditioner in most cases operate with reduced speeds.

A description will be made hereinunder as to how the operation pressure ratio of an air conditioner compressor varies throughout a year.

Figure 7:
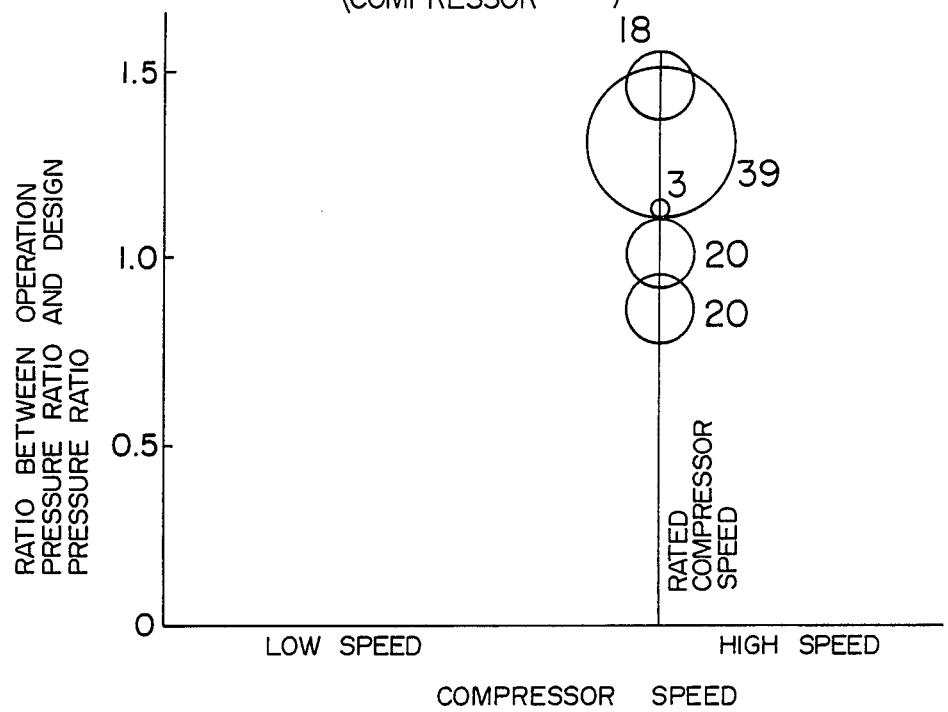
FIG. 7 is a diagram illustrating the pattern of operation of an air conditioner employing a constant speed compressor.
Figure 8:
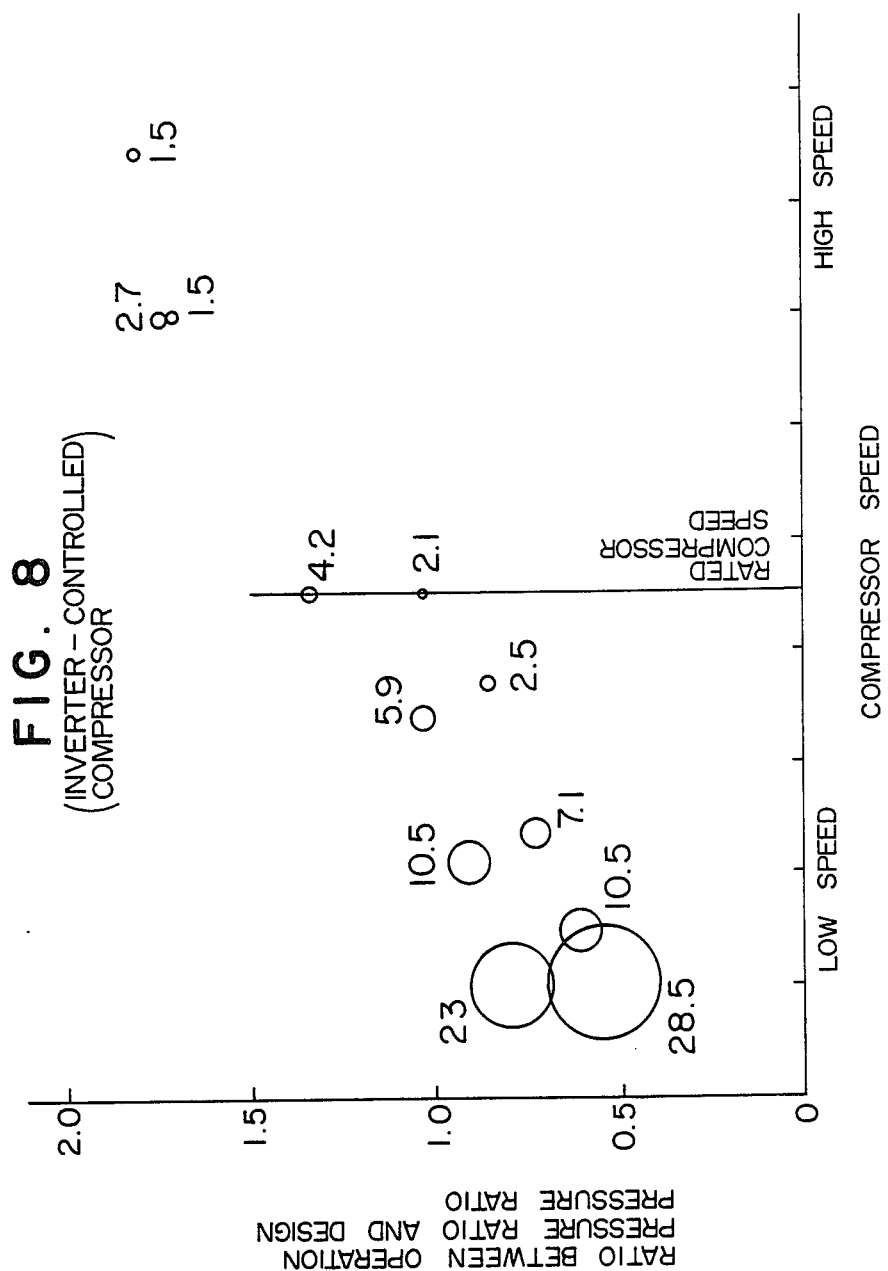
FIG. 8 is a diagram illustrating the pattern of operation of an air conditioner employing a variablespeed compressor.

FIGS. 7 and 8 are graphs showing the actual operation patterns of compressors, as observed throughout year in an air conditioner incorporating a constant-speed scroll compressor and an air conditioner incorporating an inverter controlled variable-speed scroll compressor, respectively. In each of these figures, the axis of abscissa represents the operation speed of the compressor, while the axis of ordinate represents the ratio between the operation pressure ratio and the design pressure ratio of the compressor.

In each of these figures, there are shown a plurality of circles. The coordinate position of the center of each circle represents an operating condition of the compressor. The diameter of each circle and the numeral attached to the circle show the percentage of the length of time through which the compressor operates under the operating condition expressed by the coordinate position of the center of the circle to the total working time throughout a year, i.e., the frequency of operation under the operating condition expressed by the coordinate position of the center of the circle. As will be seen from FIG. 7, in the air conditioner incorporating a constant-speed compressor, the frequency of operation under a condition where the operation pressure ratio exceeds the design pressure ratio is high. In contrast, in the air conditioner employing a compressor the speed of which is variable by means of, for example, an inverter exhibits a high frequency of operation in the region where the factor in terms of the ratio between the operation pressure ratio and the design pressure ratio ranges between 0.5 and 0.75. This frequency is as high as 85% in terms of the ratio of operation time length to the total operation time throughout a year.

According to the invention, at least one bypass port 21 is formed in a portion of the end plate of the stationary scroll member such that the bypass valve associated with the bypass port operates when the pressure of the gas compressed in the compression chamber to which the bypass port opens has reached a level which ranges between 0.5 to 0.75 in terms of the ratio between the operation pressure ratio and the design pressure ratio, i.e., when the pressure in the compressor chamber has reached a level which falls within the range of between 0.5 and 0.75 of the design pressure. In consequence, the wasteful over-compression is avoided in the range of operation in which the compressor operates most frequently, so that energy is saved effectively.

While the scroll compressor has been described as being incorporated in an air conditioner, it will be apparent to those in the art that the scroll compressor can also be used in a refrigerating plant.

As has been described, according to the present invention, there is provided an air conditioner or refrigeration plant incorporating a scroll compressor the speed of which is variable by means of, for example, an inverter, wherein at least one bypass port is formed in the end plate of the stationary scroll member at such a position that a bypass valve associated with the bypass port operates in a comparatively low region of the operation pressure ratio at which the compressor is driven most frequently. By virtue of the provision of the bypass port in the above-specified position, driving power is reduced to remarkably save energy in an amount which is as large as about 10% that of the energy consumed by air conditioner incorporating a scroll compressor having no bypass valve.

What is claimed is:

1. An air conditioner or refrigerating plant including a scroll-type refrigerant compressor having stationary and orbiting scroll members each having an end plate and a substantially spiral wrap protruding axially from one side of said end plate, said stationary and orbiting scroll members being so assembled as to engage with each other to define a plurality of compression chambers between their wraps, said orbiting scroll member being adapted to revolve around the center of said stationary scroll member without rotating about its own axis such that said compression chambers are progressively moved towards the center of said stationary scroll member so that a refrigerant gas confined in said compression chambers is compressed and discharged into a discharge chamber through a discharge port formed in the center of said end plate of said stationary scroll member, said air conditioner further including means for driving said compressor at a speed which is variable in accordance with an air-conditioning load, wherein said scroll compressor is provided with at least one bypass port formed in a portion of said end plate of said stationary scroll member adjacent to said wrap of said stationary scroll member so as to provide a communication between an associated compression chamber in its compression phase and said discharge chamber, and a bypass valve comprising a check valve associated with said bypass port to allow the compressed gas to flow from said compression chamber into said discharge chamber, said bypass port being so located that the bypassing flow of the gas through said bypass valve takes place when said compressor is operating under such a condition that a ratio of the operation pressure ratio to the design pressure ratio of said compressor is below 1 and falls within a range in which said compressor operates most frequently.

2. An air conditioner or refrigerating plant including a scroll-type refrigerant compressor having stationary and orbiting scroll members each having an end plate and a substantially spiral wrap protruding axially from one side of said end plate, said stationary and orbiting scroll members being so assembled as to engage with each other to define a plurality of compression chambers between their wraps, said orbiting scroll member being adapted to revolve around the center of said stationary scroll member without rotating about its own axis such that said compression chambers are progressively moved towards the center of said stationary scroll member so that a refrigerant gas confined in said compression chambers is compressed and discharged into a discharge chamber through a discharge port formed in the center of said end plate of said stationary scroll member, said air conditioner or refrigerating plant further including means for driving said compressor at a speed which is variable in accordance with an air-conditioning load, wherein said scroll compressor is provided with at least one bypass port formed in a portion of said end plate of said stationary scroll member adjacent to said wrap of said stationary scroll member so as to provide a communication between an associated compression chamber in its compression phase and said discharge chamber, and a bypass valve comprising a check valve associated with said bypass port to allow the compressed gas to flow from said compression chamber into said discharge chamber, said bypass port being so located that the bypassing flow of the gas through said bypass valve takes place when said compressor is operating under such a condition that a ratio of the operation pressure ratio to the design pressure ratio of said compressor ranges between 0.5 and 0.75.

3. An air conditioner or refrigerating plant including a scroll-type refrigerant compressor having stationary and orbiting scroll members each having an end plate and a substantially spiral wrap protruding axially from one side of said end plate, said stationary and orbiting scroll members being so assembled as to engage with each other to define a plurality of compression chambers between their wraps, said orbiting scroll member being adapted to revolve around the center of said stationary scroll member without rotating about its own axis such that said compression chambers are progressively moved towards the center of said stationary scroll member so that a refrigerant gas confined in said compression chambers is compressed and discharged into a discharge chamber through a discharge port formed in the center of said end plate of said stationary scroll member, said compressor being driven at a speed which is variable in accordance with an air-conditioning load, wherein said scroll compressor is provided with at least one bypass port formed in a portion of said end plate of said stationary scroll member adjacent to said wrap of said stationary scroll member so as to provide a communication between a compression chamber in its compression phase and said discharge chamber, and a bypass valve comprising a check valve associated with said bypass port to allow the compressed gas to flow from said compression chamber into said discharge chamber, said bypass port being so located that the bypassing flow of the gas through said bypass valve takes place when said compressor is operating under such a condition that a ratio of the operation pressure ratio to the design pressure ratio of said compressor is below 1 and falls within a range in which said compressor operates most frequently; and wherein said air conditioner or refrigerating plant further includes means for driving said compressor at a speed variable in accordance with the air-conditioning load, said driving means including
 an electric motor for driving said compressor and an inverter for varying the speed of operation of said electric motor;
 an indoor heat exchanger, an expansion valve and an outdoor heat exchanger connected in series between a discharge pipe connected to said discharge chamber of said compressor and a suction pipe connected to a suction side of said compressor; and
 a four-way change-over valve connected to a discharge side of said compressor so as to direct the compressed and discharged refrigerant gas selectively to said indoor heat exchanger and to said outdoor heat exchanger.

4. An air conditioner or refrigerating plant including a scroll-type refrigerant compressor having stationary and orbiting scroll members each having an end plate and a substantially spiral wrap protruding axially from one side of said end plate, said stationary and orbiting scroll members being so assembled together as to engage with each other to define a plurality of compression chambers between their wraps, said orbiting scroll member being adapted to revolve around the center of said stationary scroll member without rotating about its own axis such that said compression chambers are progressively moved towards the center of said stationary scroll member so that a refrigerant gas confined in said compression chambers is compressed and discharged into a discharge chamber through a discharge port formed in the center of said end plate of said stationary scroll member, said compressor being driven at a speed which is variable in accordance with an air-conditioning load, wherein said scroll compressor is provided with at least one bypass port formed in a portion of said end plate of said stationary scroll member adjacent to said wrap of said stationary scroll member so as to provide a communication between an associated compression chamber in its compression phase and said discharge chamber, and a bypass valve comprising a check valve associated with said bypass port to allow the compressed gas to flow from said compression chamber into said discharge chamber, said bypass port being so located that the bypassing flow of the gas through said bypass valve takes place when said compressor is operating under such a condition that a ratio of the operation pressure ratio to the design pressure ratio of said compressor ranges between 0.5 and 0.75; and wherein said air conditioner or refrigerating plant further includes means for driving said compressor at a speed variable in accordance with the air-conditioning load, said driving means including an electric motor for driving said compressor and an inverter for varying the speed of operation of said electric motor;
 an indoor heat exchanger, an expansion valve and an outdoor heat exchanger connected in series between a discharge pipe connected to said discharge chamber of said compressor and a suction pipe connected to a suction side of said compressor; and a four-way change-over valve connected to a discharge side of said compressor so as to direct the compressed and discharged refrigerant gas selectively to said indoor heat exchanger and to said outdoor heat exchanger.

5. A method of operating an air conditioner or refrigerating plant of the type that includes a scroll-type refrigerant compressor having stationary and orbiting scroll members each having an end plate and a substantially spiral wrap protruding axially from one side of said end plate, said stationary and orbiting scroll members being so assembled as to engage with each other to define a plurality of compression chambers between their wraps, said orbiting scroll member being adapted to revolve around the center of said stationary scroll member without rotating about its own axis such that said compression chambers are progressively moved towards the center of said stationary scroll member so that a refrigerant gas confined in said compression chambers is compressed and discharged into a discharge chamber through a discharge port formed in the center of said end plate of said stationary scroll member, said compressor being adapted to be driven at a speed which is variable in accordance with the level of an air-conditioning load, said compressor further having at least one bypass port formed in a portion of said end plate of said stationary scroll member adjacent to said wrap of said stationary scroll member, and a bypass valve comprising check valve associated with said bypass port to allow the compressed refrigerant gas to flow from said compression chamber into said discharge chamber, said method comprising:

operating said compressor at a reduced speed when the temperature of air in an air-conditioned space approaches a command temperature during an operation of said air conditioner or refrigerating plant; and causing said bypass valve to open said bypass port when said compressor is operating in such a condition that a ratio of the operation pressure ratio to the design pressure ratio of said compressor falls within the range between 0.5 and 0.75.

* * * * *